Patented May 23, 1950

2,508,878

UNITED STATES PATENT OFFICE 2,508,878

PROCESS FOR THE PRODUCTION OF CARBOTHERMAL MAGNESIUM FURNACE CHARGE

William M. Yates and Harry E. Swayze, Midland, Mich., assignors to The Dow Chemical Company, Midland, Mich., a corporation of Delaware No Drawing. Application March 24, 1945, Serial No. 584,738

4 Claims. (Cl. 75—4)

This invention concerns an improvement in making a furnace charge for the carbothermal production of magnesium.

In the production of metallic magnesium by the carbothermal process, a charge mixture of magnesium oxide and carbon is heated to a high temperature to liberate magnesium as a vapor, which is then condensed to recover the metal.

In a known method of preparing the charge mixture, the magnesium oxide and the carbon are mixed or ground together in the dry state with pitch as a binder. This mixture is heated to a temperature at which the pitch is plastic and is worked mechanically to form a coarse aggregate in which the particles of oxide and carbon are well coated with the binder. The aggregate is then briquetted, and the briquettes are heated in the absence of air to carbonize the pitch. The carbonized briquettes retain their initial shape, and, after cooling, are hard and abrasion-resistant and constitute an excellent metallurgical furnace charge.

Unfortunately, the process just described is somewhat troublesome to carry out because of the limited range of temperatures at which the mechanical working may be done satisfactorily. Thus, if the mass, during working, is a few degrees centigrade below the optimum temperature, the pitch is so stiff that power requirements become excessive and the magnesium oxide and carbon particles are not well coated. On the other hand, if the mass is a few degrees above the optimum temperature, the pitch is so fluid that the mixture, instead of forming the desired coarse aggregate, blends to a smooth sticky paste which cannot readily be removed from the mixing vessel and is difficult to handle in the subsequent briquetting step. The hot mixing temperature, then, must be carefully controlled within a very narrow range, but control of this precision is difficult, because of the low thermal conductivity of the mixture. As a result, even with the best of automatic devices, constant vigilance is required to make a uniform aggregate.

It has now been found that the need for this precise temperature control may be practically eliminated by adding a small proportion of a hydrocarbon oil to the charge mixture prior to the hot-working step. The oil seems markedly to extend the range of hot-working temperatures and permits the charge to be mixed to a coarse easily briquettable aggregate at temperatures far above that at which it begins to blend to a smooth paste if no oil is present.

The invention, then, consists in the addition of oil to a magnesia-carbon-pitch charge mixture prior to or during the hot mixing thereof, as set forth in detail in the appended claims.

Aside from the addition of oil, preparation of furnace charge in accordance with the invention is carried out in known manner. The magnesium oxide employed is usually prepared by calcining magnesite, brucite, or magnesium hydroxide. Any form of carbon may be used, although low-ash material, such as gas carbon, lamp black, or petroleum coke is preferred. So far as known, any pitch is operable, although coal-tar pitch is preferred, especially that grade having a melting point of 208° to 218° F. These ingredients are mixed in such proportions that there is enough pitch to act effectively as a binder (usually at least 15 per cent), and that the briquettes, after calcining, will contain magnesium oxide and carbon in approximately chemically equivalent proportions, due allowance being made for the residual carbon left by the pitch during calcining (one-third to one-half its weight, depending on the grade). Typical proportions are:

| | Parts by weight |
|---|---|
| Petroleum coke | 9 to 10 |
| Coal-tar pitch | 18 to 20 |
| Magnesium oxide | 70 to 73 |

These ingredients are ground together dry, i. e. at a temperature at which the pitch is a brittle solid, or they may be ground separately and mixed. The hydrocarbon oil, usually from 1 to 5 per cent of the combined weights of the other ingredients, is also added before or during the dry grinding or mixing, so that it becomes thoroughly dispersed. In so far as known, any hydrocarbon oil may be used, oils ranging from relatively light gas-oil fractions to thick petroleum oils such as "black summer oil" having been found entirely satisfactory.

The dry-mixed ingredients, including the oil, are charged into a mixer, such as a pug mill or kneading machine, provided with a heating jacket, and are worked mechanically at a temperature at which the pitch is plastic (at least 80° C. in the case of a 208°–218° F. melting pitch). During working, the pitch tends to coat the particles of magnesium oxide and carbon, so that the mass gradually agglomerates to a coarse black aggregate resembling gravel. The aggregate, while still hot, is compressed into briquettes, using rolls or an extrusion press. The briquettes are then heated in the absence of air to a temperature of at least 400° C., to carbonize the pitch and vaporize the oil, forming finished charge.

If the hot-mixing step were to be carried out in the absence of oil, as in prior processes, the mass would have to be controlled at a temperature below about 88° C. (with a 208° to 218° F. melting pitch) to insure proper agglomeration and to avoid forming a paste. However, when using oil with the same charge in accordance with the invention, the hot mixing range is widely extended, and mixing temperatures up to 120° C. or more may be used without having the mass form a paste instead of the desired coarse aggregate. In consequence, the hot mixing may be carried out in much less elaborate equipment and with far greater ease and economy.

What is claimed is:

1. A process of making a furnace charge for the carbothermal production of magnesium, which comprises mixing together finely-divided magnesium oxide, carbon, at least 15 per cent by weight of pitch, and from about 1 to about 5 percent of the combined weights thereof of a hydrocarbon oil, such mixing being carried out at a temperature at which the pitch is plastic, the oil serving to restrain the tendency of the mass to blend to a paste, briquetting the resulting mixture, and heating the briquettes in the absence of air at a temperature of at least 400° C. to carbonize the pitch.

2. A process of making a furnace charge for the carbothermal production of magnesium which comprises mixing together magnesium oxide, petroleum coke, coal-tar pitch, and from about 1 to about 5 percent of the combined weights thereof of a hydrocarbon oil at a temperature at which the pitch is a brittle solid, further mixing the resulting mass at a temperature at which the pitch is plastic, thereby forming a coarse aggregate, briquetting the aggregate, and heating the briquettes in the absence of air at a temperature of at least 400° C. to carbonize the pitch.

3. A process of making a furnace charge for the carbothermal production of magnesium which comprises mixing together 70 to 73 parts by weight of magnesium oxide, 9 to 10 parts of petroleum coke, 18 to 20 parts of coal-tar pitch, and from 1 to 5 per cent of the combined weights thereof of a hydrocarbon oil, such mixing being carried out at a temperature at which the pitch is plastic and sufficiently elevated that the mixture would blend to a smooth paste in the absence of the oil, the oil serving to prevent such blending, briquetting the resulting mixture, and heating the briquets in the absence of air at a temperature of at least 400° C. to carbonize the pitch.

4. In a process of making a furnace charge for the carbothermal production of magnesium, wherein magnesium oxide, petroleum coke, and coal-tar pitch are mixed together at a temperature at which the pitch is plastic to form an aggregate suitable for briquetting, the improvement which comprises carrying out the mixing in the presence of from 1 to 5 per cent by weight of a hydrocarbon oil and at a temperature sufficiently elevated that the mixture would blend to a smooth paste in the absence of the oil, the oil serving to prevent such blending.

HARRY E. SWAYZE.
WILLIAM M. YATES.

REFERENCES CITED

The following references are of record in the file of this patent:

UNITED STATES PATENTS

| Number | Name | Date |
|---|---|---|
| 509,428 | Edison | Nov. 28, 1893 |
| 1,467,797 | Klugh | Sept. 11, 1923 |
| 1,650,893 | Koehler | Nov. 29, 1927 |
| 2,025,740 | Hansgirg | Dec. 31, 1935 |
| 2,328,202 | Doerner | Aug. 31, 1943 |

OTHER REFERENCES

Abraham: Asphalt and Allied Substances, 4th Ed., published in 1938, by D. Van Nostrand Co., N. Y., pp. 62, 63, 354 and 355.

Bjorling: Briquettes and Patent Fuel, published in 1903, by Rebman Lt'd., London, pp. 194 and 195.